United States Patent [19]

Hara

[11] Patent Number: 5,047,849
[45] Date of Patent: Sep. 10, 1991

[54] IMAGE DISPLAY APPARATUS WITH IMAGE TURBULENCE SUPPRESSION

[75] Inventor: Zenichiro Hara, Nagasaki, Japan

[73] Assignee: Mitsubishi Denki Kabushiki Kaisha, Tokyo, Japan

[21] Appl. No.: 510,575

[22] Filed: Apr. 18, 1990

[30] Foreign Application Priority Data

Apr. 19, 1989 [JP] Japan .................................. 1-97287

[51] Int. Cl.$^5$ ............................................. H04N 7/18
[52] U.S. Cl. .................................... 358/105; 358/230
[58] Field of Search ............... 358/105, 140, 230, 138

[56] References Cited

U.S. PATENT DOCUMENTS

| | | | |
|---|---|---|---|
| 4,403,250 | 9/1983 | Kellar | 358/105 |
| 4,531,160 | 7/1985 | Ehn | 358/230 X |
| 4,625,239 | 11/1986 | Vreeswijk et al. | 358/105 X |
| 4,768,092 | 8/1988 | Ishiwaka | 358/105 |
| 4,845,557 | 7/1989 | Lang | 358/105 |
| 4,901,155 | 2/1990 | Hara et al. | 358/230 |

FOREIGN PATENT DOCUMENTS

| | | |
|---|---|---|
| 56-4185 | 1/1981 | Japan . |
| 60-158779 | 8/1985 | Japan . |
| 61-208377 | 9/1986 | Japan . |
| 63-209284 | 8/1988 | Japan . |

*Primary Examiner*—Victor R. Kostak
*Attorney, Agent, or Firm*—Burns, Doane, Swecker & Mathis

[57] ABSTRACT

An image display apparatus which detects the presence or absence of motion of each picture element at a present frame and a preceding frame regarding a video signal to be inputted, so that, when each picture element at one field by interlaced scanning is driven, in a case where motion is present at the picture element, each picture element is driven on the basis of the video signal at one field, and, in a case where motion is absent, the same is driven on the basis of a field preceding the one field, thereby displaying images.

8 Claims, 15 Drawing Sheets

TELEVISION SIGNAL
(INTERLACED SCANNING)

SCANNING LINES AT ODD
NUMBER FIELD

DISPLAY ON SCREEN

SCANNING LINES AT EVEN
NUMBER FIELD

Fig. 7
Prior Art

| A11 | A12 | A13 | A14 | A15 | A16 |
|-----|-----|-----|-----|-----|-----|
| A31 | A32 | A33 | A34 | A35 | A36 |
| A51 | A52 | A53 | A54 | A55 | A56 |

ODD NUMBER FIELD OF FIRST FRAME

| A21 | A22 | A23 | A24 | A25 | A26 |
|-----|-----|-----|-----|-----|-----|
| A41 | A42 | A43 | A44 | A45 | A46 |
| A61 | A62 | A63 | A64 | A65 | A66 |

EVEN NUMBER FIELD OF FIRST FRAME

| B11 | B12 | B13 | B14 | B15 | B16 |
|-----|-----|-----|-----|-----|-----|
| B31 | B32 | B33 | B34 | B35 | B36 |
| B51 | B52 | B53 | B54 | B55 | B56 |

ODD NUMBER FIELD OF SECOND FRAME

| B21 | B22 | B23 | B24 | B25 | B26 |
|-----|-----|-----|-----|-----|-----|
| B41 | B42 | B43 | B44 | B45 | B46 |
| B61 | B62 | B63 | B64 | B65 | B66 |

EVEN NUMBER FIELD OF SECOND FRAME

| C11 | C12 | C13 | C14 | C15 | C16 |
|-----|-----|-----|-----|-----|-----|
| C31 | C32 | C33 | C34 | C35 | C36 |
| C51 | C52 | C53 | C54 | C55 | C56 |

ODD NUMBER FIELD OF THIRD FRAME

| A11 | A12 | A13 | A14 | A15 | A16 |
|-----|-----|-----|-----|-----|-----|
| A31 | A32 | A33 | A34 | A35 | A36 |
| A51 | A52 | A53 | A54 | A55 | A56 |

| A11 | A12 | A13 | A14 | A15 | A16 |
|-----|-----|-----|-----|-----|-----|
| A21 | A22 | A23 | A24 | A25 | A26 |
| A31 | A32 | A33 | A34 | A35 | A36 |
| A41 | A42 | A43 | A44 | A45 | A46 |
| A51 | A52 | A53 | A54 | A55 | A56 |
| A61 | A62 | A63 | A64 | A65 | A66 |

DISPLAY(1,1)

| B11 | B12 | B13 | B14 | B15 | B16 |
|-----|-----|-----|-----|-----|-----|
| A21 | A22 | A23 | A24 | A25 | A26 |
| B31 | B32 | B33 | B34 | B35 | B36 |
| A41 | A42 | A43 | A44 | A45 | A46 |
| B51 | B52 | B53 | B54 | B55 | B56 |
| A61 | A62 | A63 | A64 | A65 | A66 |

DISPLAY(1,2)

| B11 | B12 | B13 | B14 | B15 | B16 |
|-----|-----|-----|-----|-----|-----|
| B21 | B22 | B23 | B24 | B25 | B26 |
| B31 | B32 | B33 | B34 | B35 | B36 |
| B41 | B42 | B43 | B44 | B45 | B46 |
| B51 | B52 | B53 | B54 | B55 | B56 |
| B61 | B62 | B63 | B64 | B65 | B66 |

DISPLAY(1,3)

| C11 | C12 | C13 | C14 | C15 | C16 |
|-----|-----|-----|-----|-----|-----|
| B21 | B22 | B23 | B24 | B25 | B26 |
| C31 | C32 | C33 | C34 | C35 | C36 |
| B41 | B42 | B43 | B44 | B45 | B46 |
| C51 | C52 | C53 | C54 | C55 | C56 |
| B61 | B62 | B63 | B64 | B65 | B66 |

DISPLAY(1,4)

Fig. 8
Prior Art

| A11 | A12 | A13 | A14 | A15 | A16 |
|---|---|---|---|---|---|
| A31 | A32 | A33 | A34 | A35 | A36 |
| A51 | A52 | A53 | A54 | A55 | A56 |

ODD NUMBER FIELD OF FIRST FRAME

| A11 | A12 | A13 | A14 | A15 | A16 |
|---|---|---|---|---|---|
|  |  |  | A14 | A15 |  |
| A31 | A32 | A33 | A34 | A35 | A36 |
|  | A32 | A33 | A34 | A35 |  |
| A51 | A52 | A53 | A54 | A55 | A56 |
|  | A52 | A53 |  |  |  |

| A21 | A22 | A23 | A24 | A25 | A26 |
|---|---|---|---|---|---|
| A41 | A42 | A43 | A44 | A45 | A46 |
| A61 | A62 | A63 | A64 | A65 | A66 |

EVEN NUMBER FIELD OF FIRST FRAME

| A11 | A12 | A13 | A14 | A15 | A16 |
|---|---|---|---|---|---|
| A21 | A22 | A23 | A24 | A25 | A26 |
| A31 | A32 | A33 | A34 | A35 | A36 |
| A41 | A42 | A43 | A44 | A45 | A46 |
| A51 | A52 | A53 | A54 | A55 | A56 |
| A61 | A62 | A63 | A64 | A65 | A66 |

DISPLAY(2,1)

| B11 | B12 | B13 | B14 | B15 | B16 |
|---|---|---|---|---|---|
| B31 | B32 | B33 | B34 | B35 | B36 |
| B51 | B52 | B53 | B54 | B55 | B56 |

ODD NUMBER FIELD OF SECOND FRAME

| B11 | B12 | B13 | B14 | B15 | B16 |
|---|---|---|---|---|---|
| A21 | A22 | A23 | B14 | B15 | A26 |
| B31 | B32 | B33 | B34 | B35 | B36 |
| A41 | B32 | B33 | B34 | B35 | A46 |
| B51 | B52 | B53 | B54 | B55 | B56 |
| A61 | B52 | B53 | A64 | A65 | A66 |

DISPLAY(2,2)

| B21 | B22 | B23 | B24 | B25 | B26 |
|---|---|---|---|---|---|
| B41 | B42 | B43 | B44 | B45 | B46 |
| B61 | B62 | B63 | B64 | B65 | B66 |

EVEN NUMBER FIELD OF SECOND FRAME

| B11 | B12 | B13 | B14 | B15 | B16 |
|---|---|---|---|---|---|
| B21 | B22 | B23 | B24 | B25 | B26 |
| B31 | B32 | B33 | B34 | B35 | B36 |
| B41 | B42 | B43 | B44 | B45 | B46 |
| B51 | B52 | B53 | B54 | B55 | B56 |
| B61 | B62 | B63 | B64 | B65 | B66 |

DISPLAY(2,3)

| C11 | C12 | C13 | C14 | C15 | C16 |
|---|---|---|---|---|---|
| C31 | C32 | C33 | C34 | C35 | C36 |
| C51 | C52 | C53 | C54 | C55 | C56 |

ODD NUMBER FIELD OF THIRD FRAME

| C11 | C12 | C13 | C14 | C15 | C16 |
|---|---|---|---|---|---|
| B21 | B22 | B23 | C14 | C15 | B26 |
| C31 | C32 | C33 | C34 | C35 | C36 |
| B41 | C32 | C33 | C34 | C35 | B46 |
| C51 | C52 | C53 | C54 | C55 | C56 |
| B61 | C52 | C53 | B64 | B65 | B66 |

DISPLAY(2,4)

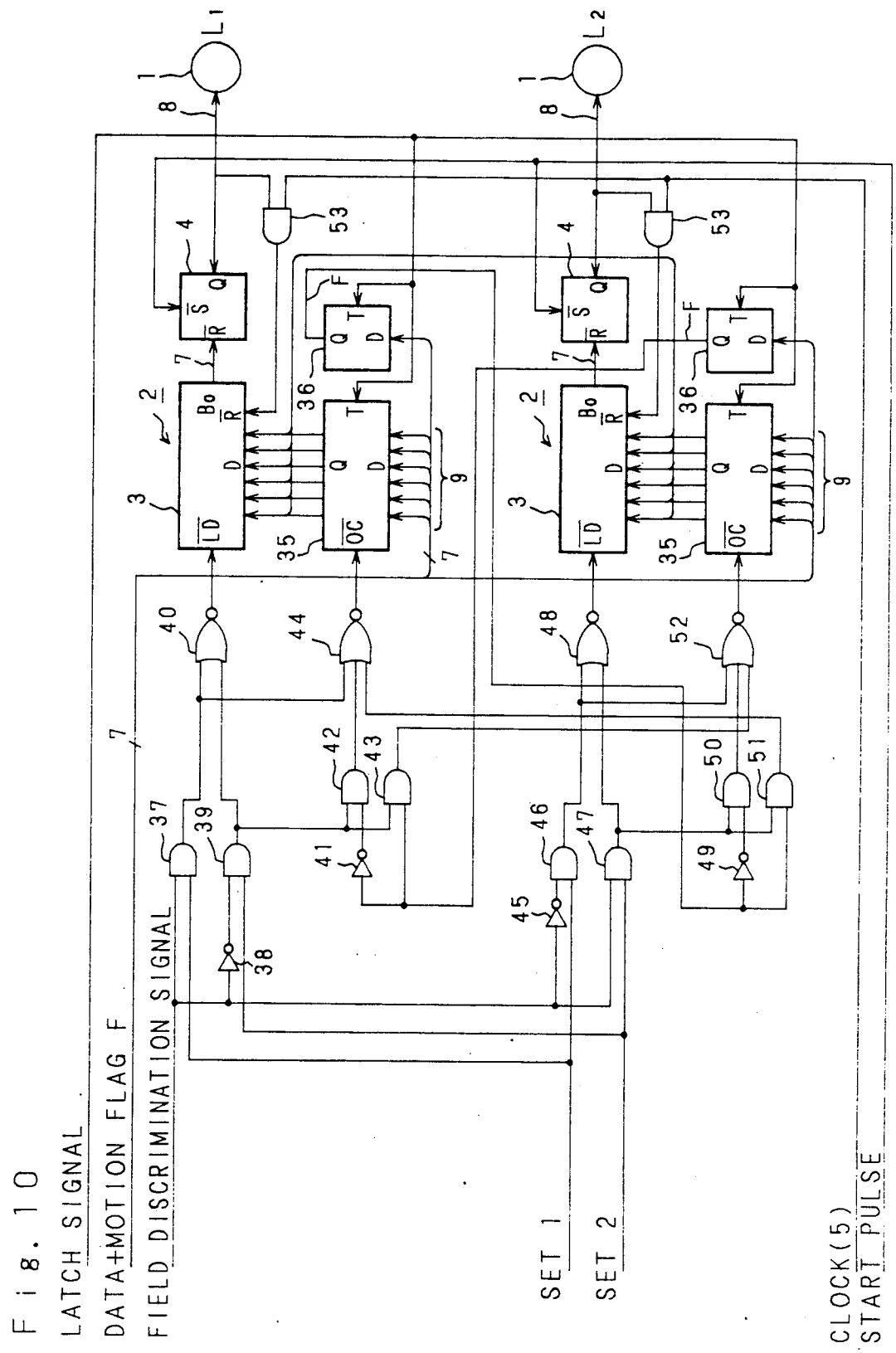

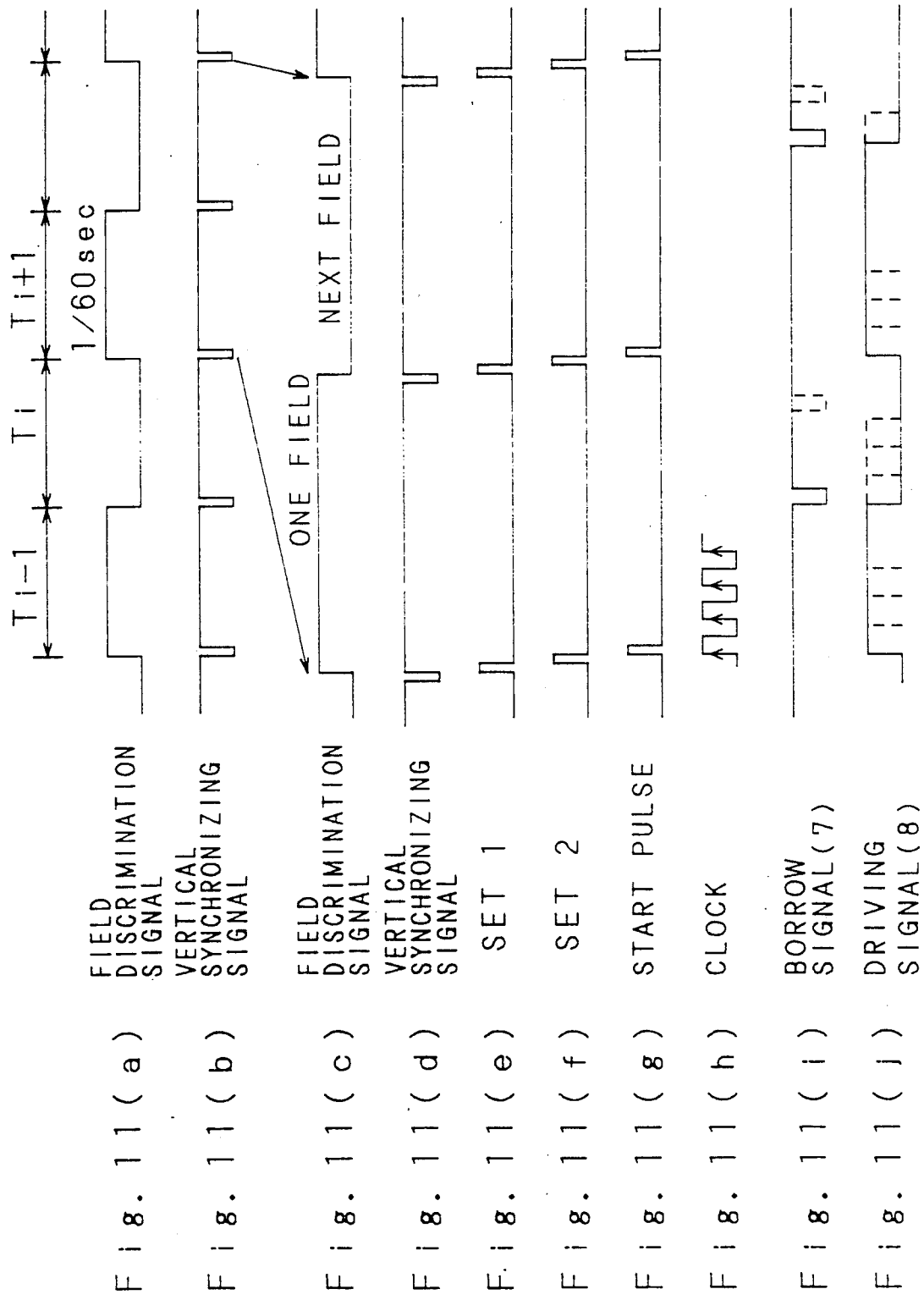

(STILL PICTURE)

(MOBILE PICTURE;
ODD NUMBER FIELD)

(MOBILE PICTURE;
EVEN NUMBER FIELD)

Fig. 13

IMAGE DISPLAY APPARATUS WITH IMAGE TURBULENCE SUPPRESSION

BACKGROUND OF THE INVENTION

1. Field of the Invention

The present invention relates to an image display apparatus for displaying images on various plane displays on which a large number of picture elements are disposed in a matrix manner.

2. Description of Related Art

FIG. 1 is a block diagram of the principal portion of the conventional television image display apparatus disclosed in, for example, the Japanese Patent Application Laid-Open No. 56-4185, in which reference numeral 1 designates one of a larger number of picture elements disposed in a matrix on a screen (not shown), the picture element 1 being driven by a driving signal 8 from a driving signal generation unit 2. The driving signal generation unit 2 comprises a down counter 3 as a data memory and a flip-flop 4, the down counter 3 and flip-flop 4 being set by a set signal 6. The down counter 3 is loaded thereon with a television video signal 9 of data of, for example, six bits and counts clock 5. The flip-flop 4 is reset by a borrow signal 7 from the down counter 3 and gives to the picture element 1 the driving signal 8 as a signal of an output terminal Q: a Q-output.

FIG. 2 is a general view of the conventional television image display apparatus, in which the components corresponding to those in FIG. 1 are designated by like numerals. In FIG. 2, reference numeral 10 designates a screen as a display unit, in which a large number of picture elements 1 are disposed in a matrix and the driving signal generation unit 2 constructed as the above-mentioned is provided for each picture element, and 12 designates an A/D converter for digitizing an analog video signal from an input terminal 11 so as to convert it into 6-bit data, the converted 6-bit data being outputted to a sampling unit 13. The sampling unit 13 thins data from the converted video signal and samples data only corresponding to the number of picture elements 1 on the screen 10. Each driving signal generating unit 2 is connected to a timing generation circuit 14 for generating the clock 5, set signal 6 and other predetermined timing signals and to the sampling unit 13 through transmission lines 100A comprising flat cables, the clock 5 and set signal 6 being transmitted from the timing generation circuit 14 to each driving signal generation unit 2 and the video signals 9 sampled from the sampling unit 13 being transmitted from the sampling unit 13 to the same.

Next, explanation will be given on operation of the television image display apparatus of the invention. The video signal inputted from the input terminal 11 is converted into a digital signal of 6 bits by the A/D converter 12 and subjected to sampling processing of data corresponding to the number of picture elements of the screen 10 on the basis of the predetermined timing signal obtained from the timing generation circuit 14. The sampled data is transmitted through the transmission line 100A to the driving signal generation unit 2 at each picture element 1. Simultaneously with the set signal 6 setting the flip-flop 4, the 6-bit video signal 9 is loaded on the down counter 3. Immediately, the down counter 3 counts the clock 5 and the Q-output of flip-flop 4, in other words, the driving signal 8 goes to a logical "1", so as to light the picture element 1. The down counter 3, after counting for a time corresponding to the loaded data, counts a value of (000000) so as to output a borrow signal 7, thereby resetting the flip-flop 4 and down counter 3. Accordingly, the driving signal is a logical "0" and the picture element is put out to stop the counting operation. Hence, the flip-flop 4 generates the driving signal 8 having a time length of 64 stages corresponding to the data loaded on the down counter 3 to result in that the picture element 1 is driven.

FIG. 3 shows another example of the conventional television image display apparatus, in which the components corresponding to those in FIG. 2 are designated with like reference numerals. In FIG. 3, reference 15 designates an interpolation control circuit for interpolating the data sampled by the sampling unit 13. The video signal 9 comprising the data of 6 bits obtained by the sampling unit 13 is transmitted to a n-number of buffer memories 17 from the sampling unit 13 via a first bus 16, the buffer memories 17 being connected to buffers 19 so as to transmit the data thereto respectively. A n-number of second buses 18 are provided from the respective buffers 19 as the initial end, the buses 18 each including a data memory and a control circuit therefor and being connected to a large number of modules 20 provided corresponding to the number of picture elements on the screen 10.

The input video signal is converted by the A/D converter 12 into the digital signal of the predetermined number of bits and subjected to sampling processing of the data corresponding to the number of picture elements on the basis of the predetermined timing signals obtained by the timing generation circuit 14, the data being interpolated by the interpolation control circuit 15. The sampled data is once stored in each buffer memory 17 through the first bus 16 and converted at the buffer memory 17 to low speed with respect to the input speed of an information input from the first bus 16 and then transmitted to each module 20 through each second bus 18.

FIG. 4 is a schematic representation of the transmission speed converted by the buffer memory 17, in which when three buffer memories 17 are shown, the digitally converted video signal 9 is written in three buffer memories 17 through a first bus 16 for the periods of $W_1$ to $W_3$. In addition, reference letter H designates a horizontal scanning period, in which $H_1$, $H_2$ and $H_3$ corresponding to the periods $W_1$, $W_2$ and $W_3$ respectively. The converted video signals 9 are transmitted to the modules 20 through the second buses 18 for the periods of $P_1$ to $P_3$ respectively. Herein, while the first bus 16 is a high speed data bus, the second bus 18 is lowered of the data transmission speed, whereby, when the buffer memories 17 is of n-number, the speed is 1/n. Therefore, a flat cable is usable. At each second bus 18, each buffer memory 17 assigns the head address to thereby sequentially transmit the subsequent data. At each module 20, the predetermined data is received on the basis of the address and the data is held to the predetermined memory corresponding to each picture element.

As the above-mentioned, the apparatus shown in FIG. 3 once writes the data in the buffer memories 17 to convert the transmission speed in order to expect efficient transmission.

FIG. 5 shows a correspondent relation between the scanning lines and the picture elements at the television signal. FIG. 5(A) shows a mode of interlaced scanning, in which the scanning lines (1) through (6) at the odd number field represented by solid lines and those (1)' through (6)' at the even number field represented by broken lines are alternately transmitted. FIGS. 5(B) and (C) show the state whose scanning lines at the odd number and even number fields are thinned out, in which Nos. 01 through 26 and 31 through 46 show sampling points respectively, FIG. 5(D) showing the display state on the screen 10 by the sampled data.

Generally, the television signal has a sufficient amount of information, so that at the screen 10 side the data corresponding to the number of picture elements included in the screen 10 are thinned from the television signal at the sampling unit 13 to thereby be utilized. FIG. 5 shows an example in which the scanning lines (4) and (4)' are thinned corresponding to the number of picture elements vertical of the screen 10. The horizontal scanning lines are similarly thinned or the sampling cycle period is changed, so as to perform the processing corresponding to the number of horizontal picture elements on the screen 10. Since the data of each picture element 1 is updated in synchronism with the television signal at every one field (1/60 sec for NTSC system), the aforesaid operation is repeated at every picture element so as to display television images of 64 stages.

Thus, this kind of conventional display apparatus utilizes part of the amount of information included in the input television signal. Hence, the number of picture elements included in the screen 10 is restricted by the amount of information included in the television signal. For example, the number of vertical picture elements on the screen 10, when the input is in the NTSC system, is at most 240 (the number of effective scanning lines per one field at the NTSC system) picture elements.

On the other hand, there is a recent tendency of requiring high densification of display for the screen. In other words, the number of picture elements constituting the screen tends to increase, whereby the number of vertical picture elements on the screen leads to exceeding the number of scanning lines (about 240 per field in the case of NTSC system) of the television signal, for which three countermeasures therefor are considered as follows:

(1) At the display unit side, the data is interpolated after A/D conversion to thereby produce data corresponding to 240 or more scanning lines.

(2) In accordance with the timing of interlaced scanning, the data of picture element column in the odd number (or even number) lines at the display unit is rewritten to one field and the data of the even number (odd number) lines is rewritten to the next field.

(3) Like the television signal obtained by IDTV (Improved Definition Television), EDTV (Extended Definition Television), or the like, at the signal source side, scanning line interpolation is performed with respect to the television signal on the basis of timing of the interlaced scanning, thereby substantially increasing the number of scanning lines per one field.

The above-mentioned three methods each have advantages and disadvantages as follows:

The above method (1), by which all the data of the screen can be rewritten by 1/60 sec per field, is realizable of smooth mobile picture display. However, since the data is interpolated at the field portion of transmission line, an amount of information to be transmitted increases corresponding to the number of picture elements on the screen (the amount of information on the screen). Since the amount of information passable through the transmission line is limited especially when a flat cable is used as the transmission line, the size of screen capable of corresponding to the amount of information is limited.

The above method (2) can correspond to 480 vertical picture elements, two times as large as the conventional method, without increasing the data transmission speed, that is, the amount of information to be transmitted. Since the data of the display unit is rewritten at every other line on each field, the data on the screen is substantially rewritten by one frame (1/30 sec), thereby generating flickering on display.

The method (2) is performed together with the data interpolation in the method (1), thereby having possibility of realizing a large-scale display. Therefore, for the method realizing the large-scale display with a smaller amount of information than the conventional, the two following inventions of improving the method (2) are proposed.

A first invention of the above is as shown in FIG. 6, in which a signal processing unit of a display apparatus disclosed in the Japanese Patent Application Laid-Open No. 60-158779 is shown. The first invention is characterized in that at the first stage of a down counter 3 is provided a latch circuit 21 in comparison with FIG. 1. In FIG. 6, each picture element on the scanning line on one field for the interlaced scanning is simultaneously driven by reloading on the down counter 3 the data latched to the former field, so that the display is repeated for the cycle period of one field (1/60 sec), thereby enabling the flickering in display to be eliminated. However, since there is a time difference by one field (1/60 sec), at every line, images of high resolution is obtained with respect to the still picture, but for quick motion images, a display difference between the scanning lines corresponding to motion for 1/60 sec simultaneously appears, thereby creating the problem in that the image becomes turbulent. FIG. 7 shows an example of display in the first invention, in which the frames surrounded by thick lines show mobile portions and parts of display difference are hatched. In the drawing, for example, at display (1, 1) are displayed data A11 to A16, A21 to A26, ..., A61 to A66 of the odd and even number fields of the first frame, but at part of motion in the frame surrounded by the thick line, the display contents are formed to be shifted between the adjacent scanning lines, which is similar to the displays (1, 2), (1, 3) and (1, 4).

The second invention is the method to reduce the turbulence in the images as above-mentioned and disclosed in the Japanese Patent Application Laid-Open No. 61-208377. The second invention makes liquid crystal display an object and provides data comparison means for detecting motion with respect to the picture element on alternate line so as to detect the existence of motion, thereby switching a data interpolating method by the existence of motion. Here, when characteristic of data interpolating method in the second invention is considered in comparison with FIG. 2, it is found that the data comparison means (motion detection means) and interpolation means are provided at the screen 10 side. The essential motion is detected of its existence by providing a frame memory at the signal source side to compare data between the frames. However, an object of the second invention is to use no frame memory and to have the same effect by device at the screen side. It is very difficult to perform interpolation together with motion detection at every picture element, whereby the detection must be on alternate lines. In FIG. 8, display examples in comparison with those in FIG. 7 are shown. Since the second invention detects motion only on alternate lines, a display difference between the scanning lines corresponding to motion for 1/60 sec is reduced by half, which is not sufficient for a complete countermeasure.

Next, the third method (3) has 480 scanning lines, two times as many as the conventional, per one field in IDTV and EDTV, thereby obtaining display of high resolution, but an amount of information to be transmitted is substantially two times larger at the signal source side, thereby creating the problem in that transmission is difficult.

SUMMARY OF THE INVENTION

An object of the invention is to provide an image display apparatus capable of performing interpolation of image data at a display unit without increasing an amount of information to be transmitted, with respect to the display unit having picture elements of high density.

Another object of the invention is to provide an image display apparatus capable of displaying images of high resolution at the display unit without increasing an amount of information to be transmitted, with respect to the display unit having picture elements of high density.

Still another object of the invention is to provide an image display apparatus capable of displaying images of high resolution at the display unit having picture elements of high density, by simple signal-processing at the display unit.

The image display apparatus of the invention detects the existence of motion of every picture element for a predetermined period (one frame) as to the input video signal, so that, when the picture element on one field by interlaced scanning is driven, the picture element is driven on the basis of video signal at the one field, and, when non motion, the same is driven on the basis of video signal at a field preceding the one field, thereby displaying images.

In addition, when motion is present at the picture element, a motion signal is generated and transmitted together with the video signal to the picture element drive unit to thereby judge the presence or absence of motion by existence of the motion signal.

The above and further objects and features of the invention will more fully be apparent from the following detailed description with accompanying drawings.

BRIEF DESCRIPTION OF THE DRAWINGS

FIGS. 7 and 8 are illustrations for variation in data at the conventional television image display apparatus, FIG. 10 is a block diagram of the principal portion of the FIG. 9 embodiment, FIG. 11, including FIGS. 11(a)–11(j), is a timing chart explanatory of operation of the FIG. 9 embodiment, FIG. 13 shows variation in data of the FIG. 9 embodiment.

DESCRIPTION OF THE PREFERRED EMBODIMENTS

Figure 1:
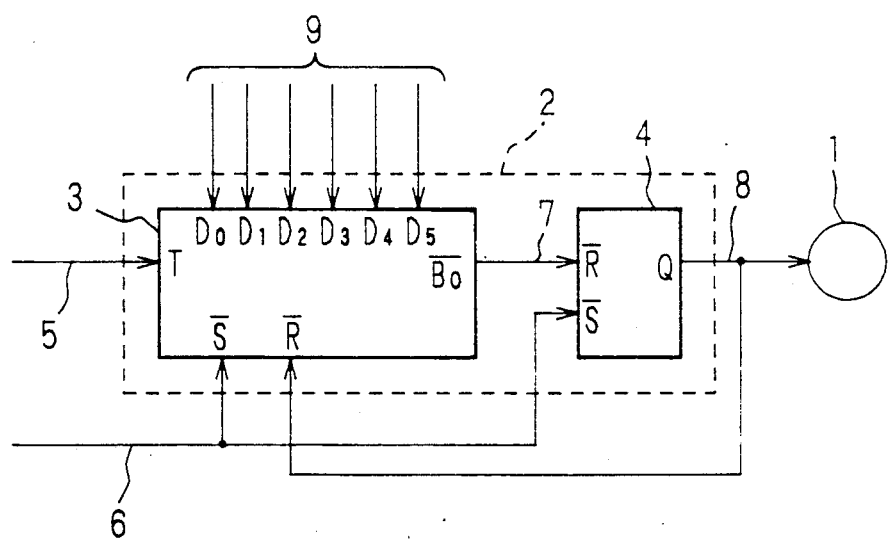
FIG. 1 is a block diagram of a principal portion of the conventional television image display apparatus.
Figure 9:
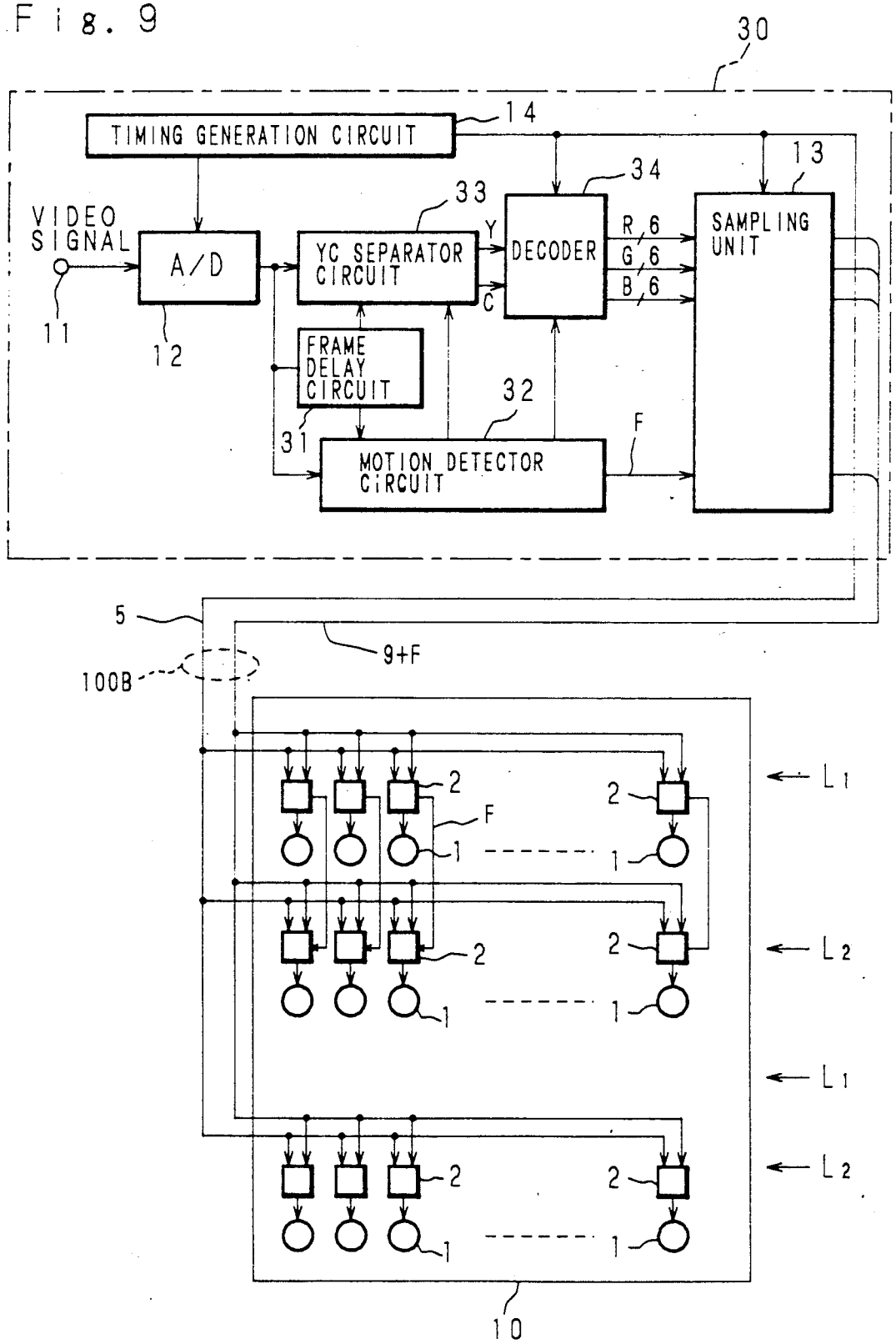
FIG. 9 is a block diagram of an embodiment of a television image display apparatus of the invention.

Referring to FIG. 9, an embodiment of the television image display apparatus of the invention is shown, in which the components correspondent to those in FIG. 1 are designated with like reference numerals. In FIG. 9, reference numeral 30 designates a signal source. The signal source 30 has an input terminal 11 for inputting an analog video signal, an A/D converter 12 for digitizing the video signal from the input terminal 11 and converting the signal into data of 6 bits, a timing generator circuit 14 for generating a predetermined timing signal, a frame delay circuit 31 for delaying by 1 frame the digital video signal outputted from the A/D converter 12, a motion detector circuit 32 for detecting motion of picture element between the frames on the basis of the digital video signal delayed by one frame and for outputting a motion flag F of 1-bit when the motion is present, a YC separator circuit 33 for separating a luminance signal Y from a chroma signal C on the basis of the digital video signal, 1-frame delayed digital video signal, and the motion flag F, a decoder 34 for decoding three elementary colors R, G and B on the basis of the luminance signal Y and chroma signal C, and a sampling unit 13 for sampling the color R, G and B signals 6 and motion flag F corresponding to the number of picture elements of the screen 10. The 6-bit video signal 9 and motion flag F of 1-bit are delivered to a transmission line 100B from the sampling unit 13 and input into each driving signal generating unit 2 for driving each picture element 1 at the screen 10. In addition, reference letter $L_1$ designates the odd number lines of 1-field at the screen 10, $L_2$ designating the even number lines at 1-field.

Figure 2:
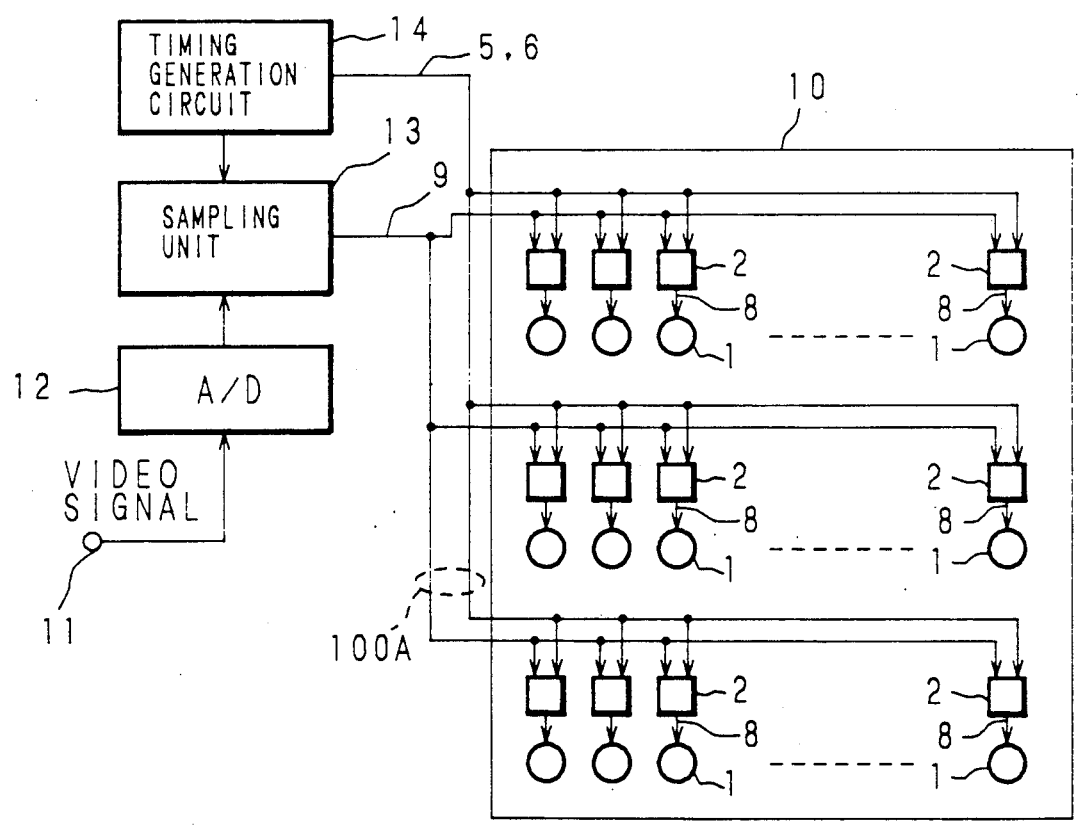
FIG. 2 is a general block diagram thereof.

In FIG. 10 of a block diagram of the driving signal generating units 2 and control circuits therearound, the components corresponding to those in FIGS. 1 and 2 are designated by like reference numbers. In FIG. 10, two sets of driving signal generating units 2 of the same construction are provided with respect to two picture elements 1 adjacent to each other in lines $L_1$ and $L_2$. The driving signal generating unit 2 each comprise a down counter 3 serving as a memory, a flip-flop 4, a latch circuit 35 which holds the 6-bit video signal 9 by a latch signal, a transmission flag, or the like and thereafter loads the signal 9 on the down counter 3, and a flag memory 36 composed of a flip-flop and for storing the motion flag F.

Also, at the $L_1$ side are provided an AND gate 37 given a field discrimination signal and a set signal Set 1, an inverter 38 for inverting the field discrimination signal, an AND gate 39 given the inverted field discrimination signal and a set signal Set 2, a NOR gate 40 for applying to the down counter 3 an output signal of the AND gate 37 or 39 as a load signal, an inverter 41 for inverting the motion flag F from the flag memory 36 at the L$_2$ side, an AND gate 42 given the output signal of the AND gate 39 and the inverted motion flag F, an AND gate 43 given the output signal of the AND gate 39 and motion flag F from the L$_2$ side, and a NOR gate 44 for applying the output signal of the AND gate 37 or 42 or an AND gate 51 at the L$_2$ side to be discussed below as a transmission flag to the latch circuit 35.

On the other hand, at the L$_2$ side are provided an inverter 45 for inverting the field discrimination signal, an AND gate 46 given the inverted field discrimination signal and set signal Set 1, an AND gate 47 given the field discrimination signal and set signal Set 2, a NOR gate 48 for applying the output signal of AND gate 46 or 47 as the load signal to the down counter 3, an inverter 49 for inverting the motion flag F outputted from the flag memory 36 at the L$_1$ side, an AND gate 50 given the output signal of AND gate 47 and the inverted motion flag F, an AND gate 51 given the output signal of AND gate 47 and the motion flag F from the L$_1$ side, and a NOR gate 52 for applying the output signal of AND gate 46 or 50 or AND gate 43 at the L$_1$ side as the transmission flag to the latch circuit 35.

In addition, reference numeral 53 designates AND gates each synchronizing the driving signal 8 with the clock 5 so as to apply the driving signal 8 to the reset terminal of down counter 3.

The AND gates 42, 43, 50 and 51 constitute motion flag discrimination means, and the down counter 3, flip-flop 4, latch circuit 35, flag memory 36, gates 37, 39, 40, 42 to 44, 46 to 48, 50 and 51, and inverters 38, 41, 45 and 49 constitute picture element drive means.

The operation of picture element drive means will be described in the timing chart in FIG. 11. The actual display state of the invention will be described in the schematic view in FIG. 12.

Figure 3:
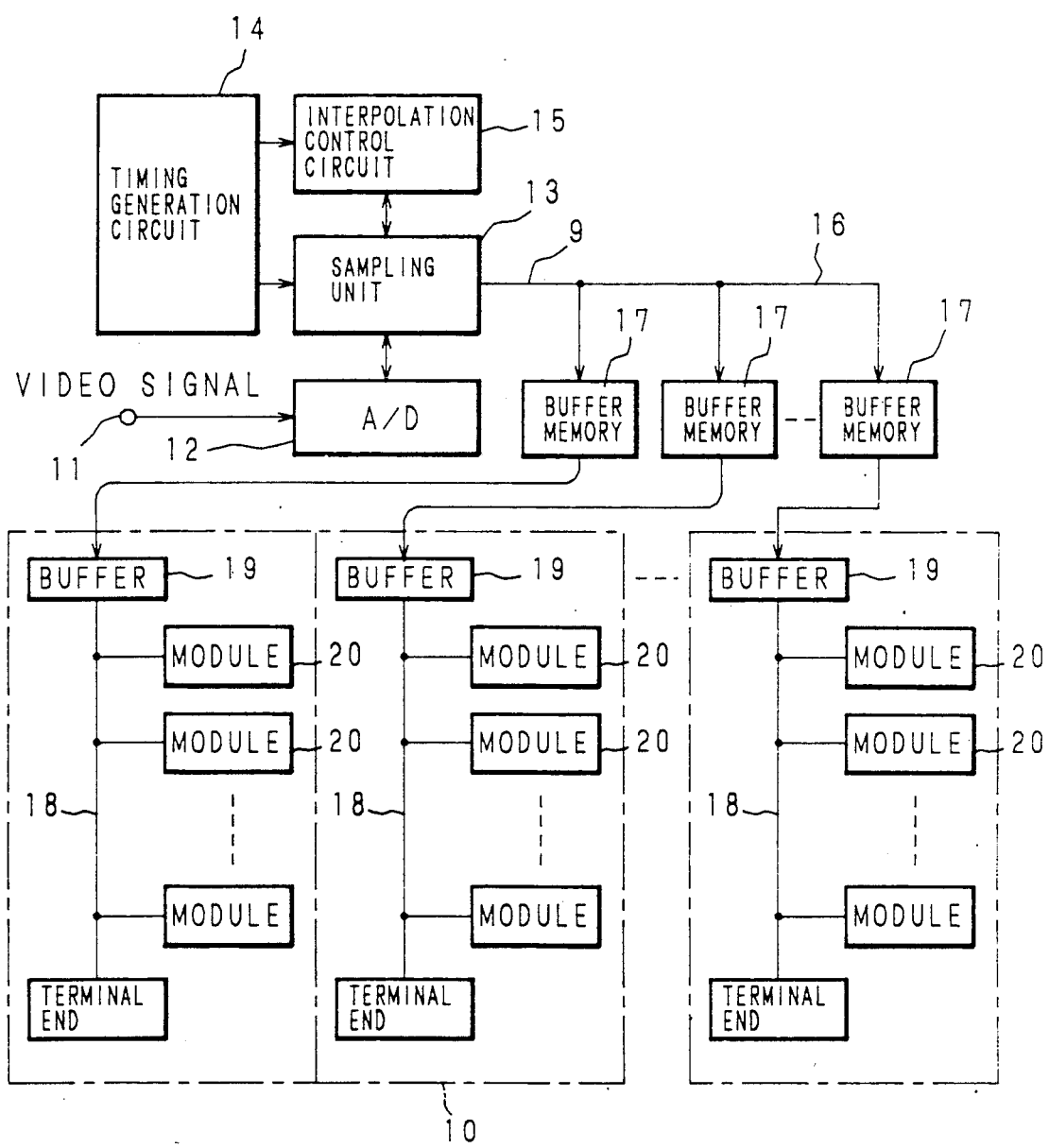
FIG. 3 is a block diagram of another conventional television image display apparatus.
Figure 4:
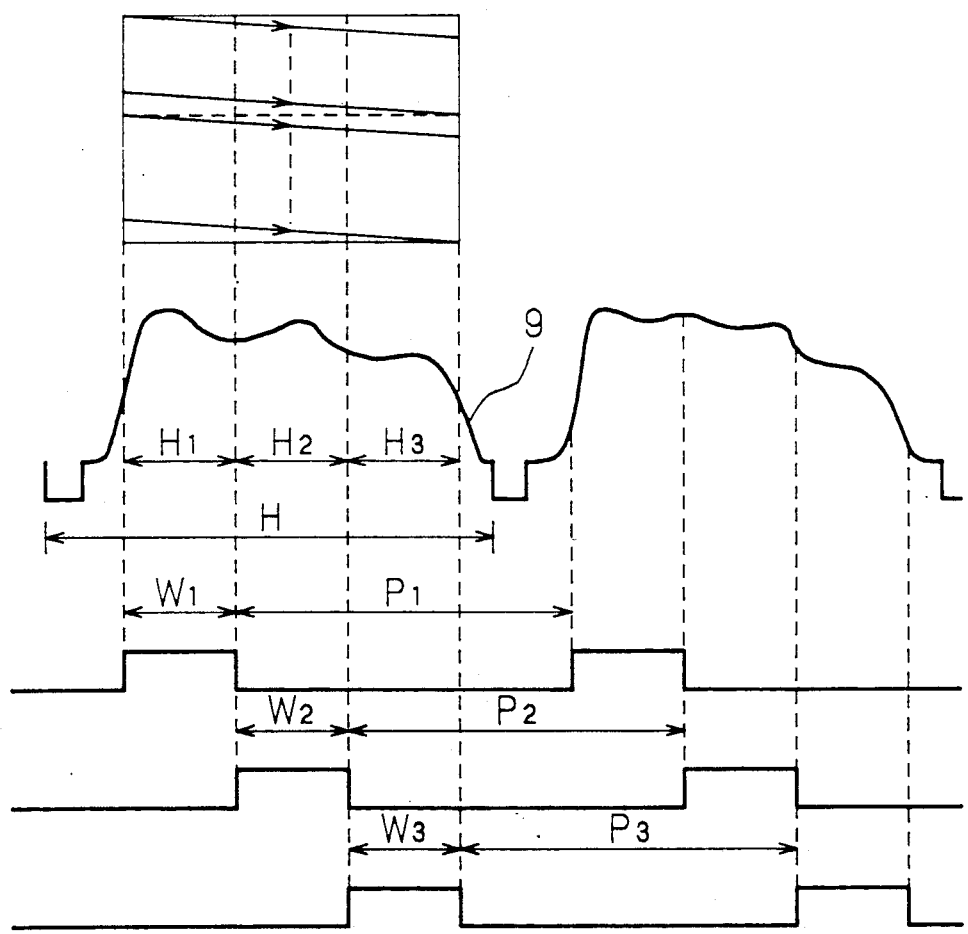
FIG. 4 is a timing chart explanatory of operation of the television image display apparatus in FIG. 3, FIGS. 5(a)–5(d) show the relation between scanning lines and picture elements of a television signal.
Figure 5A:
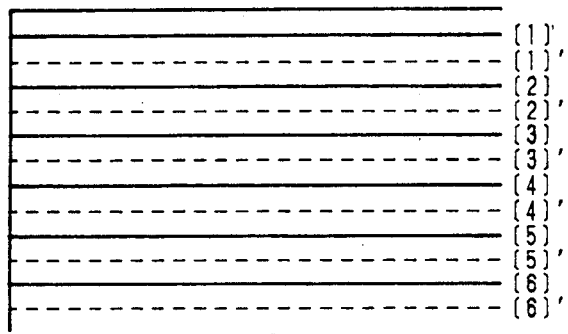
Figure 5B:
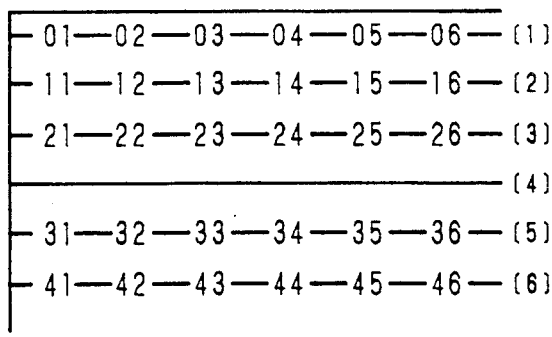
Figure 5D:
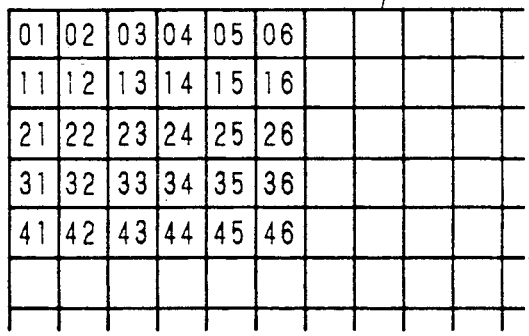
Figure 5C:
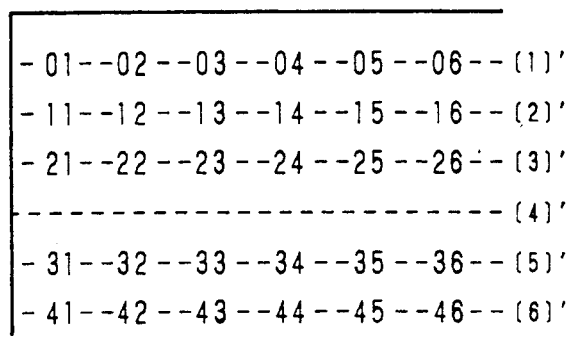

Next, explanation will be given on operation of the apparatus. In FIG. 9, the video signal is A/D converted for the predetermined cycle period and further subjected to conversion into the R, G and B color signals and motion detection. As the result, the 7-bit data added with the 1-bit motion flag F together with the 6-bit data corresponding to the picture elements 1 at the screen 10 is outputted from the signal source 30 to the transmission line 100B. The data corresponding to one field of interlaced scanning is transmitted to the L$_1$ lines and the data corresponding to another field is transmitted to the L$_2$ lines in accordance with the timing of interlaced scanning and both of data are held together with the motion flag F to the driving signal generating unit 2 corresponding to each picture element 1, wherein in order to efficiently transmit the data, the same construction as that in FIG. 3 may be made. In this case, the motion flag F with the data is transmitted through the first bus 16 and second bus 18 and held in a memory at the last module 20.

In FIG. 10, the picture element drive means for each picture element 1 operates in accordance with the timing in FIG. 11. As may be seen by comparing the field discrimination and vertical synchronization signals of FIGS. 11(a) and 11(b) with the identical signals of FIGS. 11(c) and 11(d), respectively, FIGS. 11(c)-11(i) illustrate on an enlarged scale the timing with respect to one video frame. At the one field, of FIG. 11(c) the data on the line L$_1$ held in the latch circuit 35 for the time period T$_i$ of FIG. 11(a) is loaded by the set signal Set 1 of FIG. 11(e) to the down counter 3 on the line L$_1$ (odd number field). Next, the following data is loaded by the set signal Set 2 of FIG. 11(f) to the down counter 3 on the line L$_2$ (even number field). In other words, the motion of data on the line L$_1$ is judged by the AND gates 42, 43, 50 and 51, in other words, when the motion flag F is a logical "1", the existence of motion is judged and, when a logical "0", no existence of motion is judged. If in mobile picture, data interpolated from the data at one field (data on the line L$_1$ held at the latch circuit 35 for the time period T$_i$) is used. If in still picture, the data (held by the latch circuit 35 for the period T$_{i-1}$) on the line L$_2$ held at the preceding field is used. Sequentially, start pulse of FIG. 11(g) sets a flip-flop 4, the driving signal 8 is outputted, the picture element 1 is on, and counting of clock 5 of FIG. 11(h) by the down counter 3 starts. Since display data is previously loaded on the down counter 3 from the latch circuit 35, at the point of time when the lock 5 corresponding to the data is counted, the down counter 3 outputs the borrow signal 7 of FIG. 11(i) to turn off the flip-flop 4, and the count of clock 5 ends. Accordingly, the picture element 1 is driven by the driving signal of FIG. 11(i) in a time length proportional to the display data.

Similarly, in the next field, the data (data held at the latch circuit 35 for the time period T$_{i+1}$) on the line L$_2$ is loaded to the down counter 3 on the line L$_2$ by the set signal Set 1. The data interpolated from the line L$_2$ (data held by the latch circuit 35 for the time period T$_{i+1}$) or the data on the line L$_1$ held by the latch circuit 35 for the time period T$_i$, is loaded by the set signal Set 2 to the down counter 3 on the line L$_1$ due to the existence of motion, thereby converting it in the predetermined time length.

The above-mentioned operation can realize display as shown in FIG. 12.

Figure 12A:
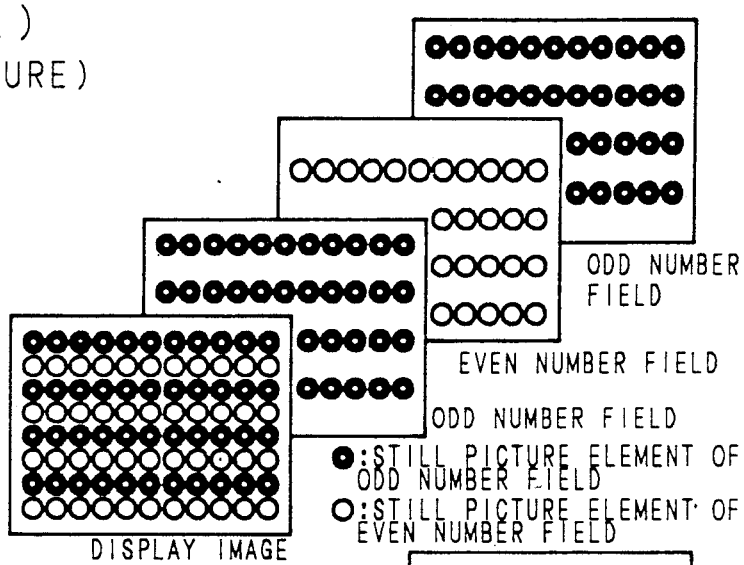
FIGS. 12(a)–12(c) show motion of picture elements of the FIG. 9 embodiment.

In the case of still picture, both the odd number field and even number field together with the data of the preceding even number field and odd number field form the last display images (refer to FIG. 12(A)).

Figure 12B:
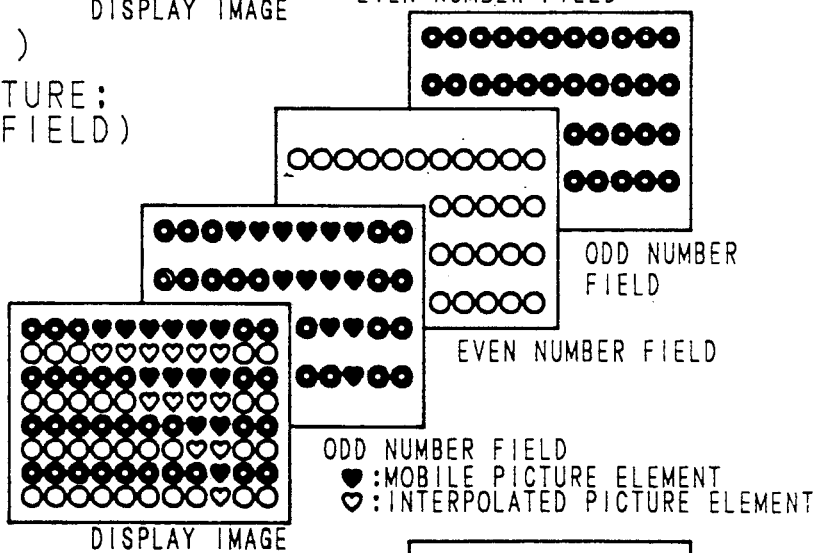
Figure 12C:
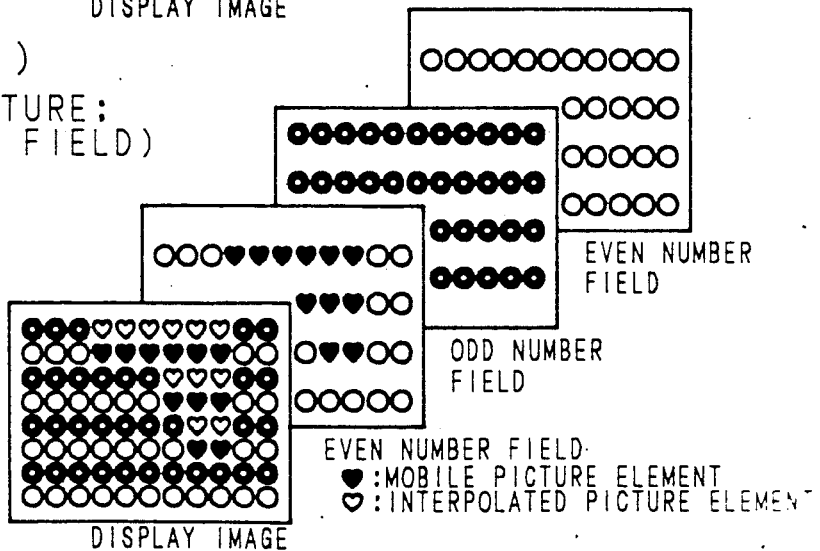

In the case of mobile picture, when motion as shown by black heart-like marks on the odd number field, the last display image is formed of all the data on the odd number field, data at the still part of the preceding even number field, and data shown by while heart-like marks (data interpolated from those of black heart-like mark) (refer to FIG. 12(B)). When motion is present in the even number field, the last display image is formed of all the data in the even number field, data at the still part of the preceding odd number field, and data interpolated from the data of motion part (refer to FIG. 12(C)).

Figure 6:
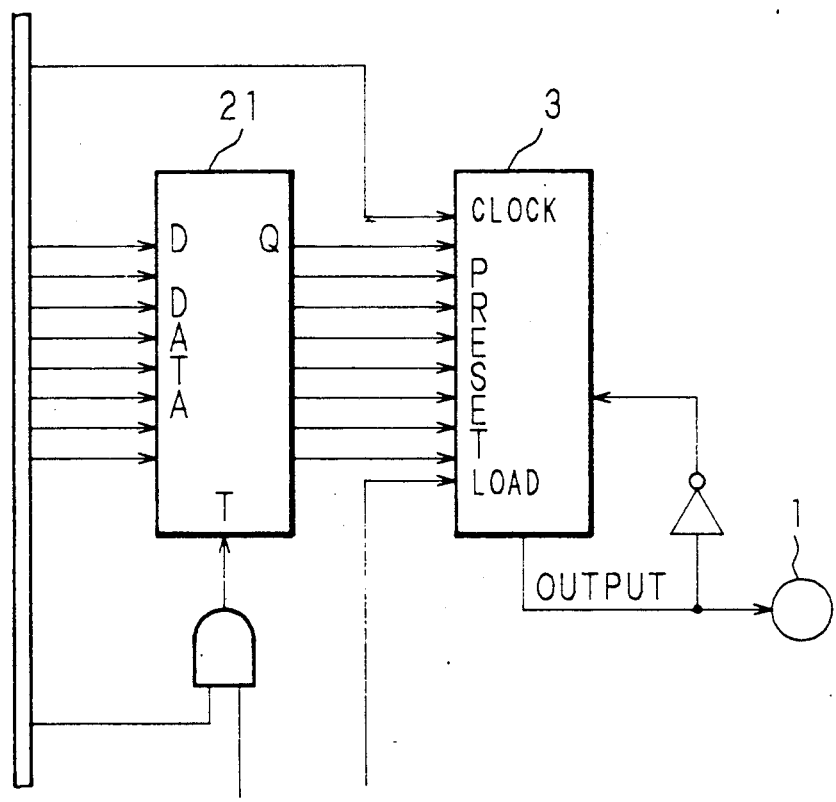
FIG. 6 is a block diagram of still another conventional television image display apparatus.
Figure 13:
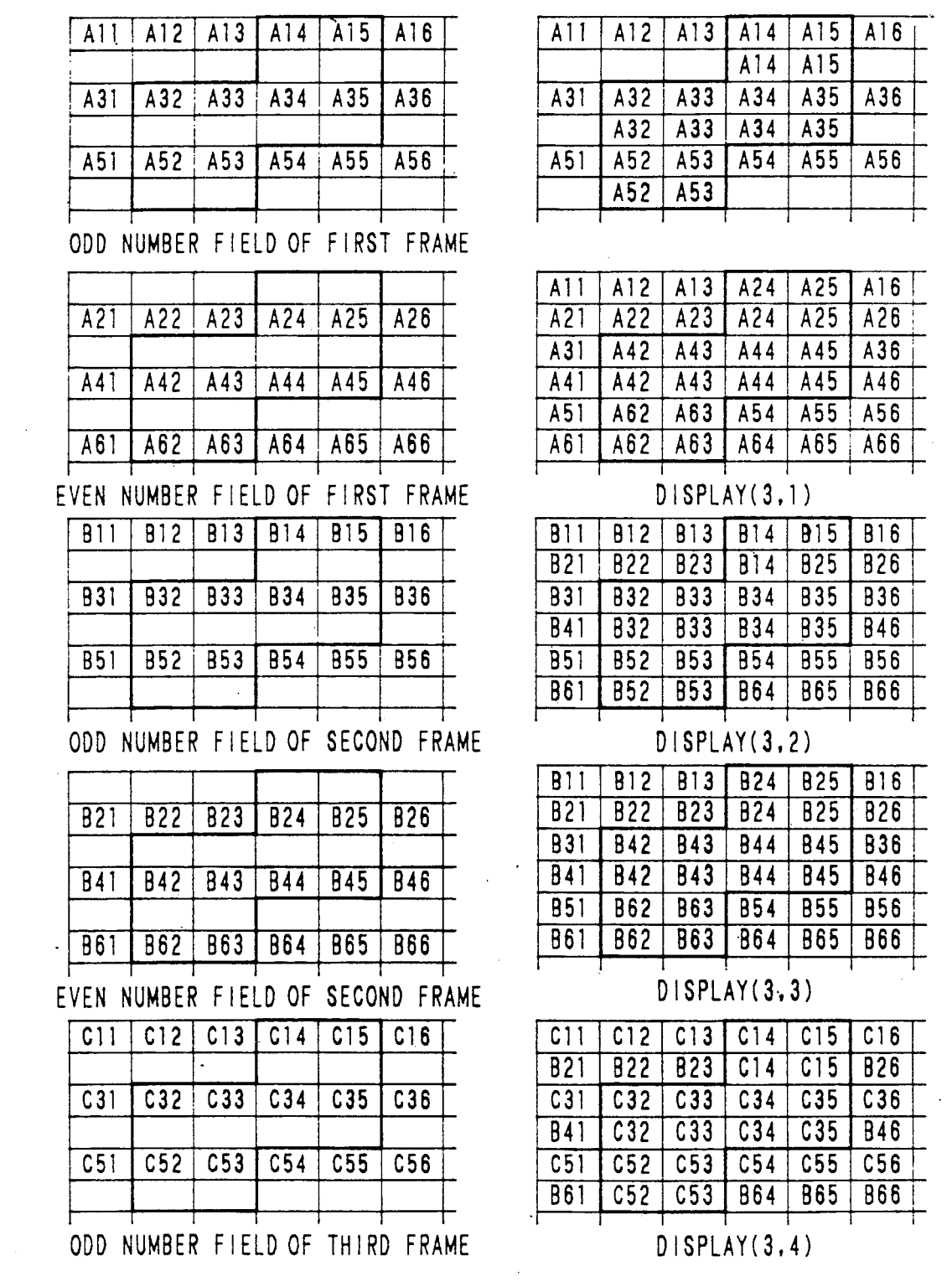

As the above-mentioned, since the data of each picture element completes conversion of time length of data in the time period of 1/60 sec, images of no flickering are obtained. For the still picture, the data of scanning lines corresponding to one frame of television signal (480 per frame when in NTCS system) is effectively used, whereby images of high resolution are obtained with respect to a screen having a large-scale number of picture elements. For the mobile picture, since only part of motion is interpolated in the same field, the problem of turbulence caused by disorder in the display content corresponding to a time difference (1/60 sec) of one field on every line is solved. In order to clarify a difference from the conventional technique, the display images in comparision with FIGS. 6 and 7 are as shown in FIG. 13, wherein when the picture elements corresponding to the scanning lines in one field of interlaced scanning are assumed to be one set, it is seen that the data is interpolated in the respective sets.

In addition, in the above-mentioned embodiments, the latch circuit as the memory is individually provided at every picture element, which may alternatively be a frame memory having address corresponding to the picture element, or other similar memory means.

Figure 14:
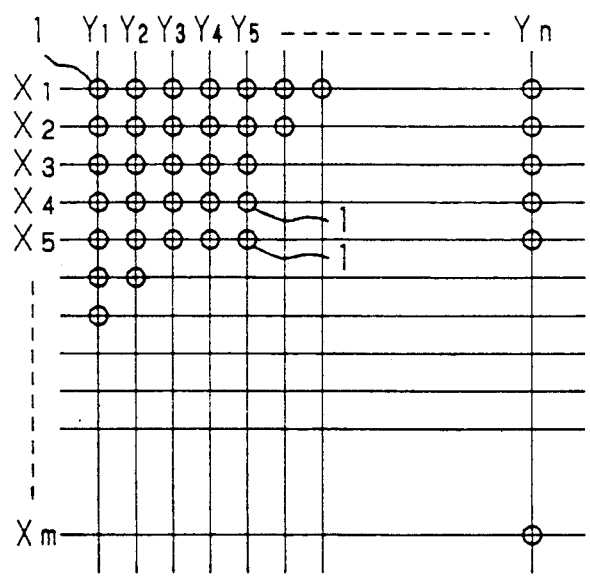
FIG. 14 is a structural view of a principal portion of a modified embodiment of the television image display unit of the invention.
Figure 15:
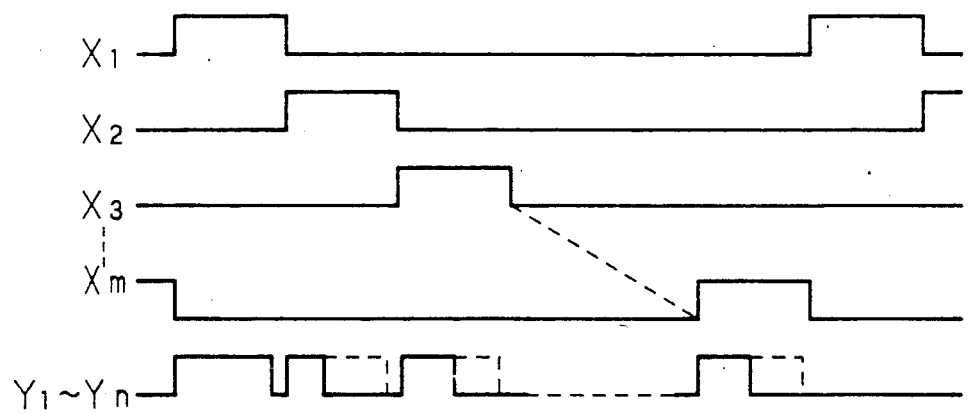
FIG. 15 is a timing chart explanatory of operation of the FIG. 14 embodiment.

Furthermore, in the above-mentioned embodiments, each picture element is independent and the embodiments are shown as the active matrix system of separately driving each picture element. Alternately, as shown in various panel displays, the display element of a method (the simple matrix system) having drive means at every line and column so as to control the picture elements positioned at the intersection of both the line and column may be used, thereby enabling the same control. FIG. 14 shows an embodiment in this case, in which the relation between the picture element and the electrode for driving it, and FIG. 15 shows the timing of driving each electrode.

In FIG. 14, reference letters $X_l$ through $X_m$ designate electrodes in the direction of the line and $Y_l$ and $Y_n$ those of the columns, the picture element 1 being provided at each intersection of the respective electrodes $X_l$ through $X_m$ and $Y_l$ through $Y_n$. As shown in FIG. 15, the electrodes $X_l$ through $X_m$ are sequentially driven for the predetermined time period and those $Y_l$ through $Y_n$ are sequentially driven at every time length corresponding to the data, so that each picture element 1 is driven to perform display. Herein, each picture element is driven by being sequentially controlled by time division at every line, to which the present invention applicable.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims, or equivalence of such meets and bounds thereof are therefore intended to be embraced by the claims.

What is claimed is:

1. An image display apparatus comprising:

display modules connected with a bus, each display module having a display part with pixels disposed in matrix form, means for driving each pixel based on a corresponding pixel data, a memory part corresponding to said display part, and means for converting the contents of said memory part to a brightness of a pixel of the display part corresponding thereto; and a signal generating means supplying image information organized in a plurality of fields to each of said display module via said bus, said signal generating means detecting motion of the image information, appending a flag indicating the presence/absence of motion to each pixel data and transmitting the data to said display module, said display module, when updating image information in one field, driving a pixel allocated to another field with a pixel data according to the presence/absence of motion as indicated by the flag of an adjacent pixel allocated to said one field, said pixel data being derived from the pixel data of said adjacent pixel allocated to said one field if the flag shows presence of motion, and being said pixel's own pixel data from a preceding field if the flag shows absence of motion.

2. An image display apparatus according to claim 1, wherein said signal generating means has a detection means, said detection means having a delay circuit for delaying a video signal by one frame and a detection circuit which compares the present video signal with the video signal delayed by one frame to thereby detect the presence or absence of motion at each of said picture elements.

3. An image display apparatus according to claim 1, wherein said signal generating means has a detection means, said detection means outputting a motion signal when said detection means detects the presence of motion at each of said picture elements.

4. An image display apparatus according to claim 3, wherein said drive means has means for judging whether said motion signal is present or absent.

5. An image display apparatus as set forth in claim 1 wherein a first pixel in a scanning line of one field and a second pixel in an adjacent scanning line of another field are paired, with said interpolation being executed in pair-wise fashion to change a pixel data from one of said first and second pixels to the other of said first and second pixels.

6. An image display apparatus according to claim 5, wherein said signal generating means has a detection means, said detection means having a delay circuit for delaying a video signal by one frame and a detection circuit which compares the present video signal with the video signal delayed by one frame to thereby detect the presence or absence of motion at each of said picture elements.

7. An image display apparatus according to claim 5, wherein said signal generating means has a detection means, said detection means outputting a motion signal when said detection means detects the presence of motion at each of said picture elements.

8. An image display apparatus according to claim 7, wherein said drive means has means for judging whether said motion signal is present or absent.

* * * * *